United States Patent [19]

Faust

[11] 4,232,184

[45] Nov. 4, 1980

[54] CABLE ADAPTER FOR CONVERTING A CABLE CLOSURE NOZZLE TO A TWO CABLE ENTRANCE

[75] Inventor: Carl W. Faust, Dover, N.J.

[73] Assignee: Bell Telephone Laboratories, Incorporated, Murray Hill, N.J.

[21] Appl. No.: 20,533

[22] Filed: Mar. 14, 1979

[51] Int. Cl.³ .................. H02G 15/013; H02G 15/113
[52] U.S. Cl. ........................................ 174/92; 174/41; 174/77 R; 174/93
[58] Field of Search ......................... 174/91–93, 174/41, 77 R, 88 R

[56] References Cited

U.S. PATENT DOCUMENTS

| | | | |
|---|---|---|---|
| 3,209,069 | 9/1965 | Ruddell et al. | 174/91 X |
| 3,339,011 | 8/1967 | Ewers, Jr. et al. | 174/92 |
| 3,458,649 | 7/1969 | Channell | 174/93 |
| 3,874,760 | 4/1975 | Guthmiller et al. | 174/91 X |
| 3,920,886 | 11/1975 | Gillemot et al. | 174/93 |
| 3,971,894 | 7/1976 | Faust et al. | 174/41 |
| 4,095,044 | 6/1978 | Horsma et al. | 174/138 |

Primary Examiner—Roy N. Envall, Jr.
Attorney, Agent, or Firm—John W. Fisher

[57] ABSTRACT

A cable adapter (10) is disclosed for converting a cable closure nozzle (16) to a selectable diameter two cable entrance. The adapter is comprised of a unitary molded member (11) of electrically insulative material. In the interior of the unitary member are first and second adjacent pluralities of concentric openings (12,13) of various diameters. These openings extend along the length of the unitary member in increasing order of diameter. The unitary member is adapted for engagement with the cable closure nozzle (16) at the larger diameter end (15). This configuration facilitates a sealed entrance of first and second axially aligned cables (17,18) into the cable closure (19).

11 Claims, 5 Drawing Figures

CABLE ADAPTER FOR CONVERTING A CABLE CLOSURE NOZZLE TO A TWO CABLE ENTRANCE

BACKGROUND OF THE INVENTION

1. Technical Field of the Invention

This invention relates to telephone cable splice closures and, in particular, to an adapter for converting a cable closure nozzle to a selectable diameter two cable entrance.

2. Description of the Prior Art

In telecommunications systems multiconductor cables are employed to extend service to a number of customers. Oftentimes the conductors in the cable are encased in a protective outer sheath. These cables must be spliced periodically to connect succeeding portions of cables and to provide access to the cables for branch cables, terminals and the like. At a splice in such cables the protective sheaths must be disturbed. This provides an opportunity for moisture and other environmental elements to reach and destroy the unprotected conductors and splice. Consequently, splice cases have been developed to seal such cable splices.

One example of a cable splice closure suitable for the above purpose is disclosed in C. W. Faust et al, U.S. Pat. No. 3,971,894 issued July 27, 1976. Faust et al disclose apparatus for enclosing splices between two or more multiconductor cables. The apparatus includes a unitary support member which has affixed thereto a cable ground sheath bonding circuit, cable support apparatus and clamps for securing the apparatus to a messenger strand. Completed splice connections are sealed in a unitary flexible weatherproof cover.

While the Faust et al closure represents a significant improvement in the design of cable splice closures, in some instances it is necessary to route two cables through a given closure nozzle. For situations such as this additional measures must be taken to insure a weathertight seal about the two cables. Accordingly, there is a need for some form of adapter to enable this type of entrance to the splice closure to be readily effected.

Some attention heretofore has been directed to a solution of this problem as evidenced by W. H. Channell, U.S. Pat. No. 3,458,649 issued July 29, 1969. Channell discloses a device including a sleeve which is used to house a cable splice. Grommets are provided for each end of the sleeve. These grommets have bushings to afford a method for sealing all cable sizes within the size range of the grommets and the sleeve.

In accordance with the Channell approach, a strip carrying a number of upstanding bushings in spaced apart relationship is provided with the cable splice sleeve. Each of the bushings has a bore which varies as to diameter and all of the bushing bodies have the same external diameters. In practice it is necessary for an installer to select the appropriate bushing whose bore diameter corresponds to the diameter of the cable to be routed into the splice sleeve. While Channell makes some attempt to accommodate various diameter cables within a given splice sleeve, no attention has been directed to the solution of the problem of routing two cables of varying diameters into a single opening in the splice sleeve such that the entry around each of the cables is sealed against environmental elements.

Another example of the effort directed to a solution of this problem appears in G. W. Gillemot et al, U.S. Pat. No. 3,920,886 issued Nov. 18, 1975. Gillemot et al disclose a kit of components for encapsulating a branch-out splice to an installed power distribution cable. The kit includes a resilient tubular splice housing having an interlocking portion and slit elastomeric grommets sealing the cable to the housing ends. A sleeve valve encircles the housing and closes a potting compound charging port. Additional slit sleeves serve as adapter grommets for accommodating smaller cable sizes. Although Gillemot et al disclose a method for accommodating two cables, they specifically rely on separate grommets and potting compound to effect an environmental seal about the two cables.

A more recent example of the state of the art of splice closures is evidenced by D. A. Horsma et al, U.S. Pat. No. 4,095,044 issued June 13, 1978. Horsma et al disclose a splice case which includes a shell defining a cavity for enclosing a splice. The shell is longitudinally split and includes openings at the ends along the longitudinal split for receiving incoming cable. A multiple cable adapter of thermally responsive sealant is sized to fit within a cable opening in the splice case and includes a plurality of longitudinally extending channels for accommodation of multiple incoming cables.

Utilization of the Horsma et al approach requires the activation of heaters located within the splice case to simultaneously cause the sealant along the longitudinal split and the adapter to form a seal and preferably an integral bond for the shell and incoming cables. As is clearly illustrated by FIGS. 3 3 through 7 of Horsma et al, accommodation of multiple cables requires a number of individual adapters. Moreover, the selection of a given adapter is limited to a given cable diameter.

In view of the foregoing, it should be evident that a satisfactory solution to the problem of converting a cable closure nozzle to a selectable diameter two cable entrance has not as yet been disclosed.

SUMMARY OF THE INVENTION

In accordance with my invention, a cable adapter is disclosed for converting a one cable closure nozzle to a selectable diameter two cable entrance. The adapter is comprised of a unitary molded member of electrically insulative material having first and second adjacent pluralities of concentric openings of various diameters therein. These openings extend along the length of the unitary member in increasing order of diameter. The unitary member is adapted for engagement with the cable closure nozzle at the largest diameter openings. This configuration facilitates a sealed entrance of first and second axially aligned cables into the cable closure.

One advantage of my adapter is that the unitary member includes a first slit which extends along its length and a second slit interior to the adapter and aligned with the first slit. These slits provide access to the first and second pluralities of concentric openings. This facilitates the employment of my adapter about cables already spliced and in place.

An additional advantage of my adapter is that means are provided both longitudinally and circumferentially about the adapter for facilitating the severance of a semicircular portion thereof to permit engagement of the appropriate concentric opening with the requisite cable diameter.

An even further advantage of my adapter is that it includes means extending along its length at a point diametrically opposite to the first slit and also about a plurality of discrete spaced-apart points on the circumferential periphery for stiffening the adapter. This stiffening insures that given first and second concentric openings in the first and second plurality of such openings remain in firm contact with the first and second axially aligned cables, respectively, upon engagement of the adapter with the cables.

BRIEF DESCRIPTION OF THE DRAWINGS

The aforementioned advantages of my invention as well as other advantages will be better understood upon consideration of the following detailed description and the appended claims taken in conjunction with the attached drawings of an illustrative embodiment in which:

DETAILED DESCRIPTION

Figure 1:
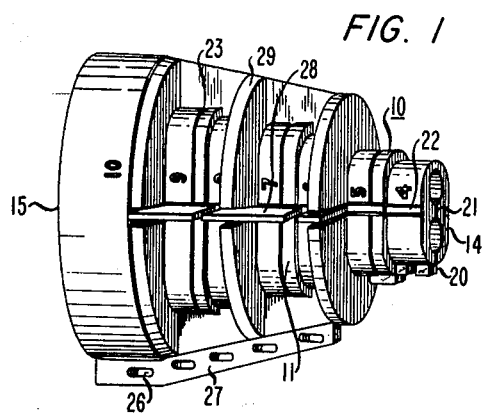
FIG. 1 is a perspective view of a cable adapter having small diameter openings at one end and larger diameter openings at an opposite end.

A cable adapter 10 for converting a one cable closure nozzle to a selectable diameter two cable entrance is shown in FIG. 1. Adapter 10 is comprised of a unitary molded member 11 of electrically insulative material.

Figure 2:
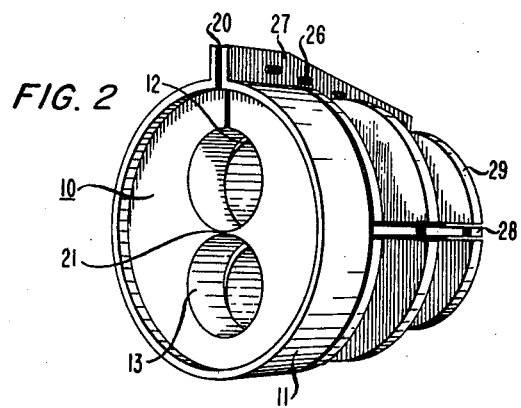
FIG. 2 is a rear view of the adapter partially illustrating the first and second adjacent pluralities of concentric openings of various diameters.
Figure 3:
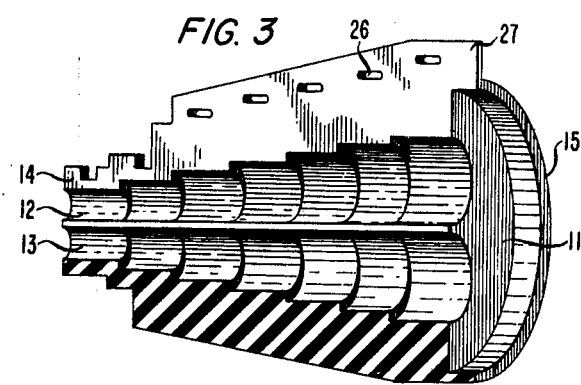
FIG. 3 is a sectional view of the adapter more completely illustrating the first and second adjacent pluralities of concentric openings.

In an interior region of unitary member 11, as shown most clearly in FIGS. 2 and 3, are first and second adjacent pluralities of concentric openings 12 and 13, respectively. Concentric openings 12 and 13 have various diameters which increase in size from small diameter end 14 to large diameter end 15. Adapter 10, at the large diameter end 15, is configured for engagement with a one cable closure nozzle 16 shown most clearly in FIG. 5. This configuration of adapter 10 and the engagement of large diameter end 15 with the cable closure nozzle 16 ensures a sealed entrance of axially aligned cables 17 and 18 into cable closure 19.

Extending along the length of unitary member 11, as shown in FIGS. 1 and 2, is a first slit 20. Slit 20 is used to gain access to the first plurality of concentric openings 12. A second slit 21 is provided in the interior of unitary member 11. Slit 21 is aligned with slit 20 and like slit 20 it too extends along the length of unitary member 11. Similar to slit 20, slit 21 is used for gaining access to the second plurality of concentric openings 13.

Figure 4:
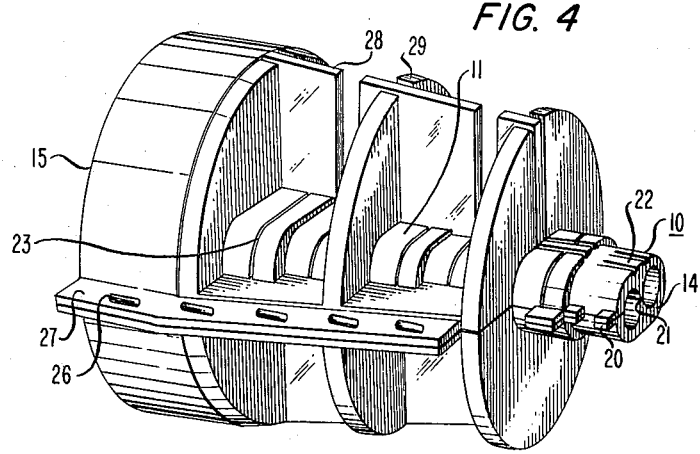
FIG. 4 is a side view of the adapter illustrating the stiffening means and the means for facilitating the severance of one or more semicircular portions of the adapter.
Figure 5:
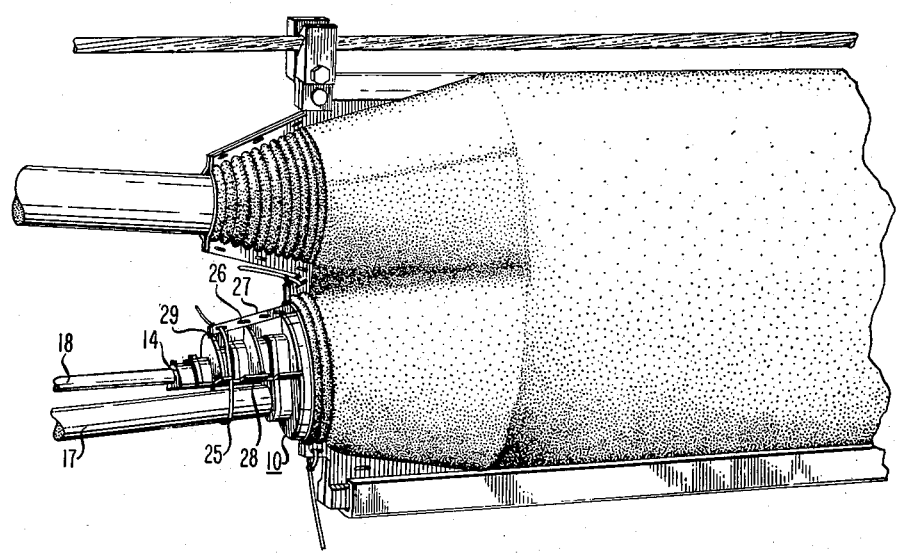
FIG. 5 illustrates the adapter in engagement with a cable closure nozzle.

As illustrated in FIG. 4, the facilitate engagement of a proper size concentric opening 12 with first cable 17, shown in FIG. 5, unitary member 11 is provided with pairs of diametrically opposite longitudinal grooves 22. Grooves 22 extend along the length of unitary member 11 from small diameter end 14 up to but not including large diameter end 15. Similarly, extending circumferentially about unitary member 11 at a plurality of discrete, spaced-apart locations are a series of circumferential grooves 23. Grooves 22 and 23 facilitate the severance of a first semicircular portion of unitary member 11 so that an appropriate concentric opening 12 is exposed for engagement with first cable 17. Grooves 22 and 23 also facilitate the severance of a second semicircular portion of unitary member 11, where required, to expose an appropriate concentric opening 13 for engagement with second cable 18.

Once the appropriate diameter concentric openings 12 and 13 have been selected and the first and second semicircular portions of unitary member 11 have been severed therefrom, keeping in mind that the second semicircular portion is removed only if needed, unitary member 11 can be advantageously slipped around axially aligned cables 17 and 18 should these cables already be in place as shown in FIG. 5. If cables 17 and 18 are to be installed, the installation of adapter 10 is even easier to effect.

After adapter 10 has been reconfigured through the severance of the semicircular section or sections, as noted above, it is fastened about cables 17 and 18 by tie wraps 25. One form of tie wrap suitable for this purpose is disclosed in U.S. Pat. No. 3,186,047 issued to William E. Stillwell, Jr. on June 1, 1965. Tie wraps 25 are threaded through apertures 26 in fastening web 27 and extended around the circumferential periphery of adapter 10. Consequently, the appropriate diameter concentric openings 12 and 13 are brought into firm engagement with the pair of axially aligned cables 17 and 18 and are held in this relationship by tie wraps 25.

To aid in maintaining this firm engagement of adapter 10 about cables 17 and 18, unitary member 11, as shown in FIG. 4, includes longitudinal stiffening members 28 and circumferential stiffening members 29. Longitudinal stiffening members 28 extend along the length of unitary member 11 at a point diametrically opposite to first slit 20. Circumferential stiffening members 29 extend around the periphery of unitary member 11 at a plurality of discrete spaced-apart radial points.

In all cases it is to be understood that the above-described embodiment is illustrative of but a small number of many possible specific embodiments which can represent applications of the principles of the invention. Thus, numerous and various other embodiments can be devised readily in accordance with these principles by those skilled in the art without departing from the spirit and scope of the invention.

I claim:

1. A cable adapter for converting a one cable closure nozzle to a selectable diameter two cable entrance comprising:

a unitary molded member of electrically insulative material having first and second adjacent pluralities of concentric openings of various diameters therein, said openings extending along the length of said unitary member in increasing order of diameter, said unitary member adapted for engagement with said cable closure nozzle at the largest diameter openings so as to facilitate a sealed entrance of first and second axially aligned cables into said cable closure; and means, extending along the length of said member at a plurality of discrete longitudinal positions and about a plurality of discrete spaced-apart points on the circumferential periphery of said member, for stiffening said member so that given first and second concentric openings in said first and second pluralities of said openings remain in firm contact with said first and second axially aligned cables, respectively, upon engagement of said unitary member with said cables.

2. The cable adapter in accordance with claim 1 wherein said unitary member further includes:
a first slit, extending along the length of said unitary member, for providing access to said first plurality of concentric openings; and
a second slit, interior to said unitary member, aligned with said first slit and extending along the length of said unitary member, for providing access to said second plurality of concentric openings.

3. The cable adapter in accordance with claim 2 wherein said unitary member further includes:
first means, extending along a portion of the length of said unitary member and positioned along diametrically opposite surfaces, for facilitating the severance of a first semicircular portion of said member to permit engagement of one of said first plurality of concentric openings with said first cable; and
second means, extending circumferentially about said member at a plurality of discrete, spaced-apart locations, for facilitating the severance of said first semicircular portion of said member, said second means further facilitating the severance of a second semicircular portion of said member, where required, to permit engagement of one of the larger concentric openings in said second plurality of such openings with said second cable.

4. The cable adapter in accordance with claim 2 wherein said unitary member further includes:
means, integral with said member along opposite sides of said first slit, for facilitating the fastening of said member about said first and second cables.

5. A cable adapter for converting a one cable closure nozzle to a selectable diameter two cable closure entrance comprising:
a unitary molded member of electrically insulative material having first and second adjacent pluralities of concentric openings of various diameters therein, said openings extending along the length of said unitary member in increasing order of diameter from a small diameter end to a large diameter end;
a first slit, extending along the length of said unitary member, for providing access to said first plurality of concentric openings;
a second slit, interior to said unitary member, aligned with said first slit and extending along the length of said unitary member, for providing access to said second plurality of concentric openings; and
means, extending along the length of said member at a point diametrically opposite to said first slit and about a plurality of discrete spaced-apart points on the circumferential periphery of said member, for stiffening said member so that given first and second concentric openings in said first and second pluralities of said openings remain in firm contact with said first and second cables, respectively, upon engagement of said unitary member with said cables.

6. The cable adapter in accordance with claim 5 wherein said unitary member further includes:
first means, extending along a portion of the length of said unitary member and positioned along diametrically opposite surfaces, for facilitating the severance of a first semicircular portion of said member to permit engagement of one of said first plurality of concentric openings with a first cable; and
second means, extending circumferentially about the periphery of said unitary member at a plurality of discrete spaced-apart locations, for facilitating the severance of said first semicircular portion of said member, said second means further facilitating the severance of a second semicircular portion of said member, where required, so as to permit engagement of one of the larger concentric openings in said second plurality of such openings with a second cable which is in axial alignment with said first cable.

7. The cable adapter in accordance with claim 6 wherein said unitary member further includes:
means, integral with said member along opposite sides of said first slit, for facilitating the fastening of said member about said first and second cables.

8. A cable adapter for converting a one cable closure nozzle to a selectable diameter two cable entrance comprising:
a unitary molded member of electrically insulative material having first and second adjacent pluralities of concentric openings of various diameters therein, said openings extending along the length of said unitary member in increasing order of diameter, said unitary member adapted for engagement with said cable closure nozzle at the largest diameter openings so as to facilitate a sealed entrance of first and second axially aligned cables into said cable closure; and
means, extending along the length of said member and about a plurality of discrete spaced-apart points on the circumferential periphery of said member, for stiffening said member so that given first and second concentric openings in said first and second pluralities of said openings remain in firm contact with said first and second axially aligned cables, respectively, upon engagement of said unitary member with said cables.

9. The cable adapter in accordance with claim 8 wherein said unitary member further includes:
a first slit, extending along the length of said unitary member, for providing access to said first plurality of concentric openings; and
a second slit, interior to said unitary member, aligned with said first slit and extending along the length of said unitary member, for providing access to said second plurality of concentric openings.

10. The cable adapter in accordance with claim 9 wherein said unitary member further includes:
first means, extending along a portion of the length of said unitary member and positioned along diametrically opposite surfaces, for facilitating the severance of a first semicircular portion of said member to permit engagement of one of said first plurality of concentric openings with said first cable; and
second means, extending circumferentially about said member at a plurality of discrete, spaced-apart locations, for facilitating the severance of said first semicircular portion of said member, said second means further facilitating the severance of a second semicircular portion of said member, where required, to permit engagement of one of the larger concentric openings in said second plurality of such openings with said second cable.

11. The cable adapter in accordance with claim 9 wherein said unitary member further includes:
means, integral with said member along opposite sides of said first slit, for facilitating the fastening of said member about said first and second cables.

* * * * *